Dec. 28, 1937.  E. R. WHEELER ET AL  2,103,761
SELECTING SYSTEM
Filed Jan. 20, 1930   3 Sheets-Sheet 3
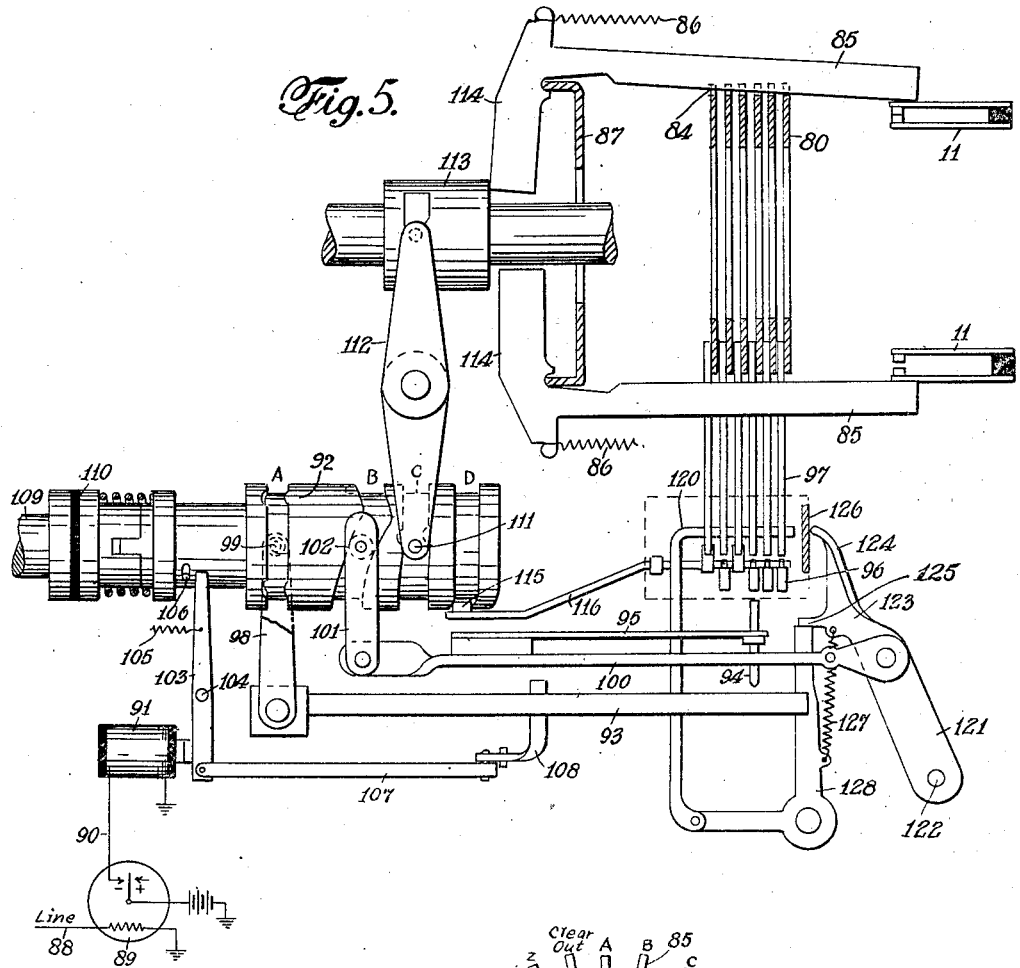
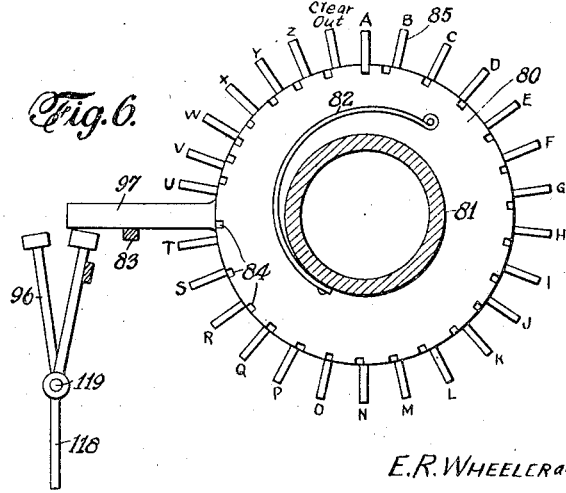
INVENTOR
E. R. WHEELER and E. U. SORTORE
BY Eugene C. Brown
ATTORNEY Patented Dec. 28, 1937

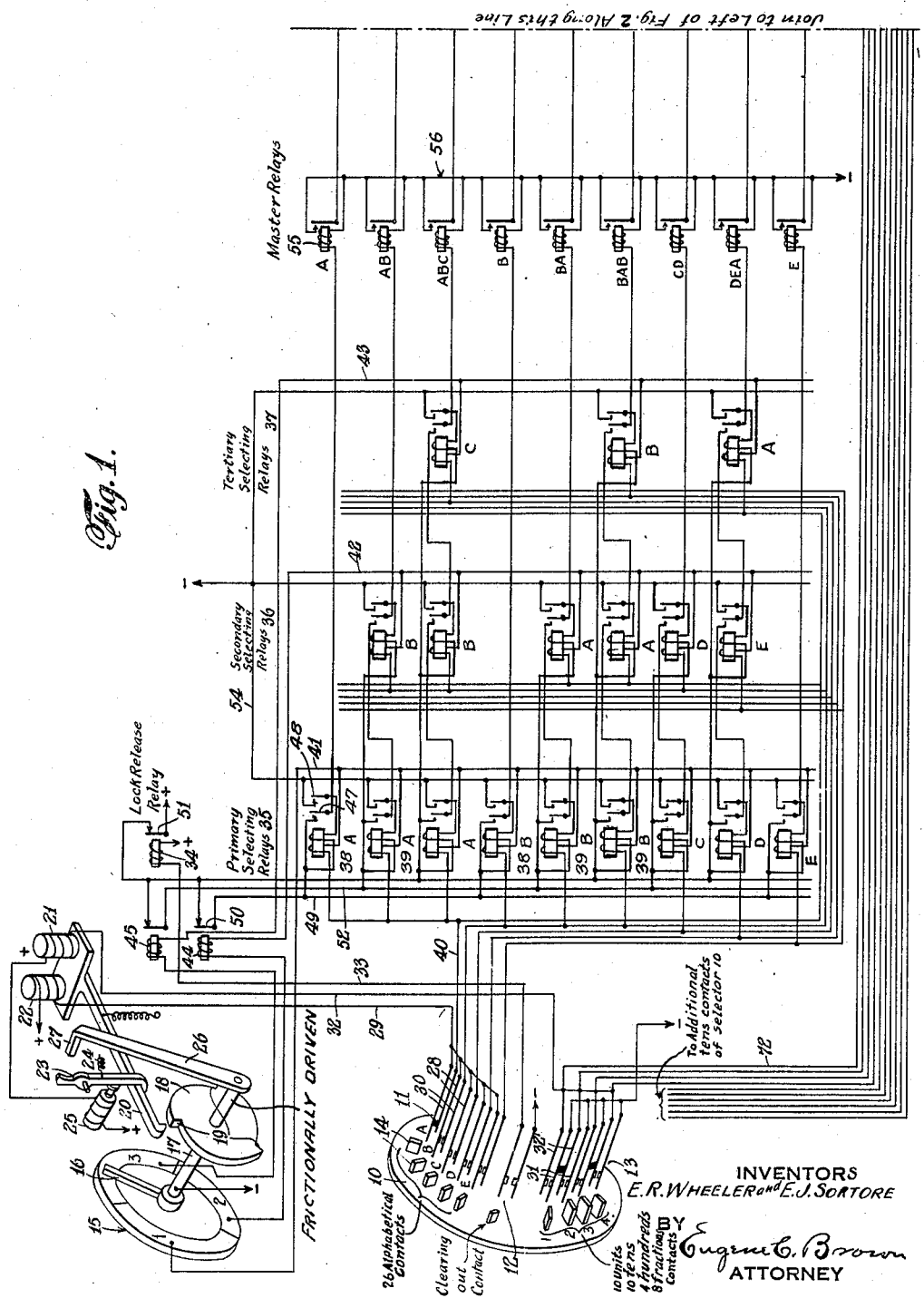

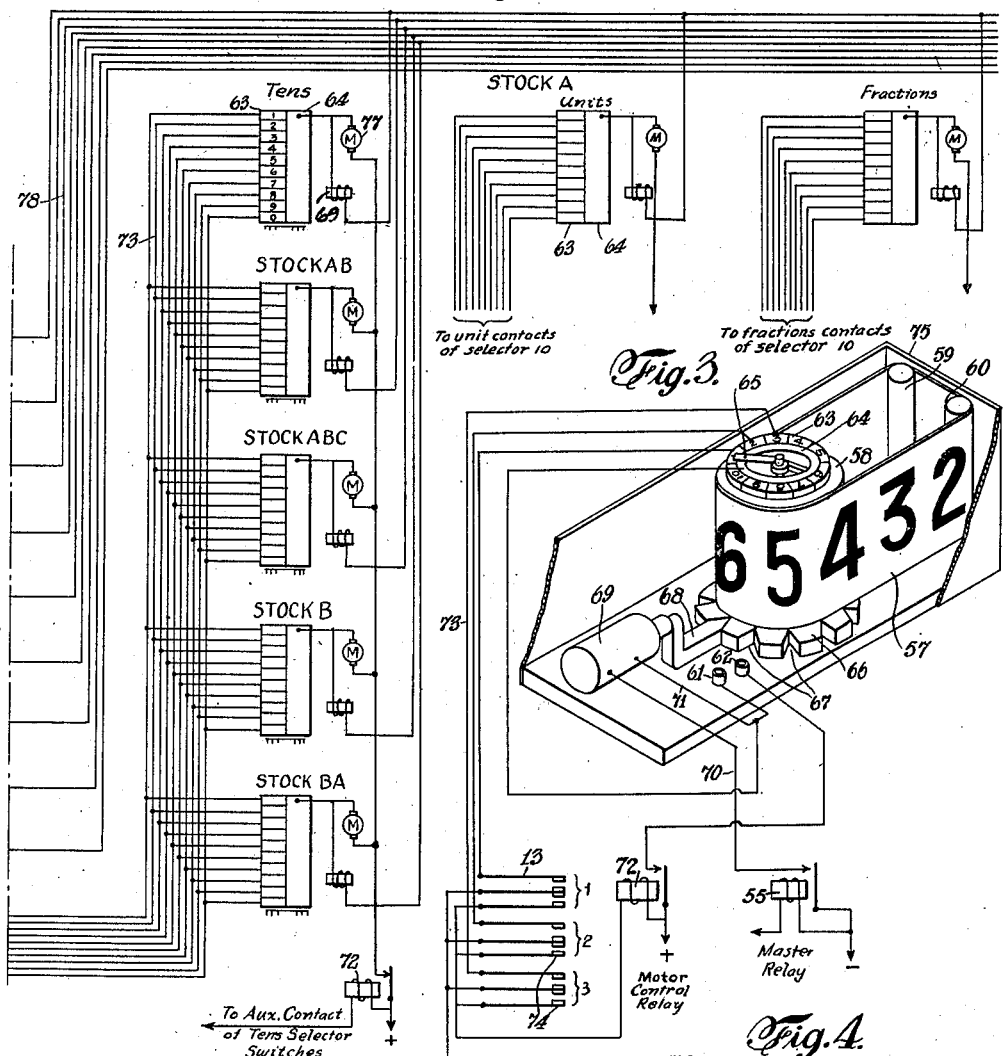

2,103,761

UNITED STATES PATENT OFFICE 2,103,761

SELECTING SYSTEM

Evan R. Wheeler, North Plainfield, and Emerson J. Sortore, Metuchen, N. J., assignors to The Western Union Telegraph Company, New York, N. Y., a corporation of New York Application January 20, 1930, Serial No. 422,150

13 Claims. (Cl. 177—353)

This invention relates to an electric signalling system and more particularly to a method of and apparatus for operating selecting apparatus in response to electric signals transmitted over a single line wire whereby one or more of a large number of circuits may be selected at a distant point.

The invention is especially applicable to a remote controlled item quotation system, such as stock quotations whereby the prices of a multitude of different items may be posted, although it is not limited to such a system.

In a stock quotation system the code signals, corresponding to the desired quotation, may be transmitted from a common point, such as a stock exchange and distributed to selecting and indicating apparatus located at brokers' offices, banks and similar places, whereby the quotations may be posted automatically and with a minimum of delay.

The information concerning each stock which it is desired to post upon the automatic quotation board is the "open", "high", "low" and "last" quotations of the day and the "closing" quotation of the preceding day. These quotations involve the use of four indicating units corresponding to the hundreds, tens, units and fractional values of the stock. It is necessary therefore, to provide on the quotation board five sets of indicators, each set having four indicator units and the apparatus must be capable of responding to the transmitted signals, first to select the particular stock to be posted, second to select the range thereof, i. e., whether the "open", "close", "high", "low" or "last" quotation and third to operate each of the indicator units of the selected stock and range to post a new price or quotation. The present invention is concerned only with the apparatus for selecting the particular stock or other item to be posted.

In remote controlled stock quotation systems, as heretofore constructed and shown for example in patent to Steeneck No. 2,034,064, granted March 17, 1936, the stock selection has been obtained by giving each stock an arbitrary three digit designating number and transmitting three series of impulses of either positive or negative polarity corresponding in number of impulses to each of the digits of the stock designating number. These impulses are transmitted over two or more lines to operate the selecting mechanism at the quotation board. The signals transmitted over each line wire may consist of interspaced positive and negative impulses, the positive impulses forming one control channel between the transmitting and receiving stations and the negative impulses forming another control channel. Two line wires provide facilities for four channels of communication, three of which, as stated, are used for the stock selection, the fourth being used for the range selection.

The number of stocks which may be selected by a system employing two line wires is thus limited to 999 and since the listings on the New York stock exchange at the present time exceed this number, it is the practice to employ two distinct systems for each office, each system accommodating half of the listings on the exchange. The use of arbitrary number designations for the stocks also requires the conversion of the usual alphabetical abbreviations or designations of the stock, into the numerical designations. Due to the extremely large number of stocks listed on the exchange this conversion cannot be readily accomplished mentally by the transmitting operator and the automatic conversion mechanism devised for this purpose is complicated.

It is one of the objects of the present invention therefore, to produce a selecting system in which the alphabetical item designations or abbreviations may be transmitted directly to the selecting apparatus and the signals corresponding thereto be employed at the receiving station to effect the selection.

Another object is to increase the possible number of item selections which may be accomplished with a single selecting system.

Another object is to produce a transmitting and receiving selecting system requiring but a single line wire, which will be rapid and dependable in operation.

A still further object is to produce an automatic item selecting system which is operable on signals of the Baudot code type.

Another object is to provide a system in which it is necesasry to transmit item selecting signals and to allot line time to signals corresponding only to the actual characters of the alphabetical item designation of the particular item.

Other objects and advantages will hereinafter appear.

In accordance with our invention we employ a single line wire for transmitting the selecting signals to the selecting system and if desired several selecting systems may be serially arranged so as to be operated from the same line wire.

We employ a so-called start-stop system of transmission employing a uniform impulse code of the Baudot type composed of a start impulse, five or more character selecting impulses, and a stop impulse. The character selecting impulses consist of different combinations of positive and negative impulses, each character combination corresponds to one letter of the alphabet. Where the stock or other item selection only is to be accomplished by means of the code a five unit code is sufficient since it gives thirty-two different code combinations. This enables at least one distinct code combination to be used for each letter of the alphabet and one or more clearing out signals, when required, for restoring the selecting system to normal after a selecting operation.

However, we prefer to employ a six unit code since this gives a total of sixty-four code combinations, thus providing sufficient code combinations, in addition to the alphabetical signals, to effect the operation of the indicators at the quotation board, of the item selected by the alphabetical code combinations. In our copending application, Serial No. 422,148, filed January 20, 1930, and entitled "Stock selecting and indicating system", we have shown and described a complete stock selecting and indicator operating system for a quotation board operable upon a six unit code.

The twenty-six letter code signals operate the contacts of a primary receiving selector, associated with the selecting mechanism, to complete the selecting circuits. Briefly the primary receiving selector comprises a number of notched code disks, a separate disk being provided for each impulse of the unit code. The code disks are shifted in accordance with whether positive or negative impulses are received so as to assume, for each letter code combinations, one of a possible twenty-six different relative positions. In each position of the code disks there is a single set of notches in alignment. An annular row of contact control bars, one being provided for each letter of the alphabet, are disposed around the code disks and are urged towards the notches therein by spring pressure, so that in each position of the code disks one of the control bars is enabled to enter the aligned notches. The movement of the contact control bars into the aligned notches closes an electrical contact and thereby establishes a circuit extending from the primary receiving selector to the selecting apparatus.

The start impulse operates a line magnet associated with the primary receiving selector to set a cam shaft into operation to shift the disks in accordance with the five or six succeeding impulses constituting the character code combination. The stop impulse brings the cam shaft to rest in readiness for the next group of signal impulses.

A three segment commutator, having a rotating brush, is associated with the receiving selector so that the brush will be stepped around over one contact for each letter code combination received. A master relay is provided for each item appearing on the quotation board, the function of which is to complete the return circuit from the selected indicators. The master relay is controlled by one, two or three intermediate relays, depending upon the number of letters in the alphabetical abbreviation of the item. For convenience we have termed the relays which respond to the signals representing the first letter of the abbreviation or designation, the primary selecting relays, those responding to signals representing the second letter of the abbreviation, the secondary selecting relays and the third group corresponding to the third letter of the stock abbreviation, the tertiary selecting relays.

The three segment commutator controls the distribution of the circuits closed through the contacts of the primary receiving selector in response to the first, second or third letter combination of the item abbreviation, to the primary, secondary and tertiary groups of relays, respectively.

The master relay closes an electrical path from the return of the magnets of each of the indicators of the item selected, thus preparing a path to be completed by the figure code signals for operating the selected indicators.

In order that the invention may be more fully understood reference will be had to the accompanying drawings in which:

Figure 1 is a circuit diagram of the primary receiving selector and the selecting mechanism controlled thereby;

Figure 2 is a circuit diagram of the indicator units associated with the selecting mechanism;

Figure 3 is a perspective view, partially cut away, of one of the indicator units;

Figure 4 illustrates the arrangement of one set of indicator units on the quotation board.

Figure 5 is a somewhat diagrammatic illustration of the primary receiving selector;

Figure 6 is an elevational view of the code disc; and

Figure 7 is a fragmentary view, showing the arrangement for operating the code disc selecting fingers.

Referring to Figure 1 we have shown a receiving selector 10 having a group of letter contacts 11, a clearing out contact 12 and a number of figure contacts 13. While letter contacts A to E only are shown it will be understood that a letter contact is provided for each letter of the alphabet.

The letter contacts control a group of twenty-six circuits for making the stock selection through a group of selecting relays. The clearing out contact serves to restore the selecting mechanism to normal after each cycle of operation and the figure contacts control circuits for operating the selected indicators. Each contact is closed by one of a number of contact control bars 14 operated in response to the code signals. The construction of the primary receiving selector is shown in Figures 5, 6, and 7 and will be described in more detail hereinafter.

The receiving selector has associated with it a three segment commutator 15, having segments 1, 2, and 3. The commutator is engaged by a rotary brush 16 mounted on a shaft 17, which may be driven through a friction clutch or other form of slip clutch from a continously operating motor, not shown.

A stop wheel 18 is rigidly mounted upon the shaft 17 and has three notches 19 adapted to be engaged by a stop arm 20, to hold the shaft against rotation. A magnet having two windings 21 and 22 controls the operation of the stop arm 20 to remove it from the notches 19 and thereby permit the shaft 17 to rotate a third of a revolution so as to move the brush 16 over one segment of the commutator. A latch 23 is normally held out of engagement with the stop arm 20 by a spring 24 and is adapted to be attracted by a magnet 25, when energized, to lock the stop arm in its upper or release position, to permit the shaft 17 to rotate continuously. The winding of the magnet 25 is connected in series with the winding 21 of the commutator control magnet. A lever 26 rigid with the shaft 17 has an inturned end 27 which engages the latch 23 at the end of each revolution of the brush to trip the latch and permit the stop arm 20 to re-engage the stop wheel 18.

The commutator 15 controls the distribution of the letter signals to the stock selecting relays, so that the signal corresponding to the first letter of the stock abbreviation or designation will operate the primary selecting relays, the second letter signal will operate the secondary selecting relays and the third letter signal will operate the tertiary selecting relays.

One contact 28 of each of the letter switches is joined by a conductor 29 to the winding 22 of the commutator operating magnet and thence to a source of positive potential. The opposite contact 30 of each of the letter switches is connected to the windings of the selecting relays in a manner to be described hereinafter. One contact 31 of each of the figure switches 13 is connected by a conductor 32 to the winding 21 of the commutator operating magnet, thence to the winding of the latch magnet 25 and to a source of positive potential. The opposite contacts 32' of the figure switches are connected to the segments of the commutator of the operating motor of the indicators positioned on the quotation board. The clearing-out switch 12 completes the circuit from positive battery through a conductor 33 to the winding of a lock release relay 34.

The stock selection is accomplished through a series of relays corresponding in number to the number of letters in the alphabetical abbreviation of the stock. For instance, for a stock having the abbreviation "ABC", three selecting relays would be provided. The relay corresponding to the first letter of the stock abbreviation, namely the "A" relay in the present case, is termed the primary selecting relay. The relay corresponding to the second letter of the stock selection or "B" relay is the secondary selecting relay and the relay corresponding to the third letter of the abbreviation, or "C" relay, is the tertiary relay. The primary relays of all stocks appearing on the quotation board are arranged in one vertical group 35, which, as shown in Figure 1, comprises three "A" relays, three "B" relays, a "C" relay, a "D" relay and an "E" relay. It will be understood that there may be one or more relays for each letter of the alphabet in the primary group. The secondary and tertiary relays are similarly grouped at 36 and 37. For a stock, the abbreviation of which comprises a single letter, as "A", only one selecting relay would be employed, as shown at 38, this relay being positioned in the primary group. Stocks having two letter abbreviations require two selecting relays disposed in the primary and secondary groups respectively, as indicated at 39.

One end of each of the operating windings of the "A" relays, of all groups are connected by a conductor 40 to the contact 30 of the "A" switch, at the receiving selector. Similarly the operating windings of the "B" relays are connected to the contacts of the "B" selecting switches and so on for each letter of the alphabet. The opposite ends of the operating windings of each relay of the primary group are connected by a conductor 41 to segment 1 of the commutator 15 and through the brush 16 thereof to a source of negative potential. The return ends of the operating windings of the selecting relays of the secondary group 36 are connected by a conductor 42 to segment 2 of the commutator 15 and the return ends of the operating windings of the tertiary relays 37 are connected by a conductor 43 to segment 3 of the commutator. Conductor 42 has the winding of a primary release relay 44 in series therewith and conductor 43 has the winding of a secondary release relay 45 in series therewith.

Each of the selecting relays has two contact tongues 47 and 48 and corresponding front contacts.

The locking or right hand winding, of each of the relays 38 corresponding to single letter stock abbreviations, is connected by a conductor 49 through the contact tongue 50 and back contact of the primary release relay 44 and thence through the back contact and tongue 51 of the lock release relay 34, to a source of positive potential. Similarly the locking or right hand winding of each of the relays 39 corresponding to two letter stock abbreviations, is connected through the conductor 52 and contacts of the secondary release relay 45 to the contacts of the lock release relay 34 and thence to positive battery. The locking windings of the relays of the three letter stock abbreviations are connected by a conductor 53 directly to the back contact of the lock release relay 34.

The opposite or right hand terminal of the locking winding of each relay is connected to the tongue 48 of the same relay and the front contact of tongues 48, of each of the selecting relays, is connected by a conductor 54 to a source of negative potential.

The front contacts of tongues 47, of the primary selecting relays, are also connected through the contacts of the release relays 44 or 45 and 34 to the source of positive potential. The tongues 47 of the primary selecting relays 38, corresponding to single letter abbreviation, are connected directly to one end of the winding of a master relay 55. There is one master relay provided for each stock. The tongue 47 of each of the primary relays, corresponding to two or three letter abbreviations, is connected to the front contact of tongue 47 of the secondary selecting relays and the tongue 47 of the secondary relays of the three letter stock abbreviations are connected to the front contact of tongue 47 of the tertiary selecting relays. The tongue 47 of each of the secondary selecting relays having two letter abbreviations, is connected to the winding of the corresponding master relay and the tongue 47 of each of the tertiary relays is connected to its corresponding master relay.

The opposite ends of the windings of each of the master relays are connected through a conductor 56 to a source of negative potential.

The operation of the selecting relays is as follows: Assuming that the stock to be selected is designated by the abbreviation "ABC", three letter signal combinations, representative of these letters, will be transmitted to the receiving selector. Upon receipt of the "A" signal, the "A" switch of the selector 10 is closed completing a circuit from the source of positive current through the winding 22 of the commutator operating magnet, thence through the "A" contact of the selector 10 to the operating windings of all of the "A" relays in the primary group and thence by conductor 41 to segment 1 of the commutator (on which brush 16 normally rests) and through the brush 16 to negative battery. All of the "A" relays of the primary group will be energized and will complete their locking circuits through the contacts of the primary release relay 44 and lock release relay 34. At the same time the magnet 22 will momentarily raise the stop arm 20 to permit the brush 16 to rotate onto segment 2 of the commutator. By the time the brush passes onto segment 2 of the commutator, the "A" switch of the selector will have opened, so that none of the relays of the secondary group will be operated. The circuit of the master relay of the stock having the single letter abbreviation "A" will be completed at this time through the tongue 47 of the primary "A" relay 38.

Upon receipt of the "B" signal, the "B" selecting switch will close and complete a circuit for the operating windings of all of the B relays of the secondary group, the return circuits for these relays being completed through the windings of the primary release relay 44 and segment 2 of the commutator. The primary release relay 44 upon being energized opens its contact 50 and interrupts the locking circuit for all of the relays of the primary group corresponding to a stock having a single letter abbreviation, as for instance, relay 38. At this time it will be noted that the master relay of the stock having the two letter abbreviation "AB" is operated through the tongues 47 of the selecting relays and the circuit to the master relay of stock "ABC" is prepared through the "A" and "B" relays. The brush of commutator 30 advances at this time onto segment 3 in readiness for the last selecting signal.

Upon receipt of the "C" signal and consequent closing of the "C" switch of the selector, all of the "C" relays of the tertiary group are operated, their circuits being completed through the winding of the secondary release relay 45 and segment 3 of the commutator. The secondary release relay 45 at this time opens the locking circuits of all stocks having two letter abbreviations. The selecting relays of the ABC stock, however, are locked up directly through the contacts of the lock release relay 34 and a circuit is completed through each of the contact tongues 47 of the A, B, and C relays to the master relay of the ABC stock.

In the case of a stock having a single letter abbreviation, the circuit to the master relay is completed, as stated above, through the contacts of the primary selecting relay and the primary release relay 44, the locking circuit for the primary selecting relay being maintained since no further letter signals are transmitted. Likewise in the case of a stock having a two letter abbreviation, the circuit to the master relay is completed through the contacts of the primary and secondary selecting relays and the contacts of secondary release relay 45.

If it is desired to employ more than three letter abbreviations, the number of selecting relays may be increased accordingly and an additional release relay and segment of the commutator 15 provided for each additional letter of the alphabetical abbreviation.

The front contact of each of the master relays is connected to the conductor 56 and thence to the negative source of potential and the tongue of each of the master relays is connected to the return circuit for all of the indicators of the particular stock to which the master relay corresponds.

After the stock selection has been completed and the selected master relay held up, the figure signals are transmitted to operate the chosen indicators for the hundreds, tens, units and fractional values of the stock.

In Figure 3 we have shown one of the indicator units at the quotation board. The unit comprises an endless belt 57 mounted upon a cylinder 58 and a pair of idler rollers 59 and 60. The belt 57 has on its outer surface the figure characters 1 to 9 and 0. The cylinder 58 is driven by an electric motor contained therein. The terminals of the motor are shown at 61 and 62. Mounted above the motor is a segmented commutator having two rings 63 and 64. Ring 63 has ten segments corresponding to each figure character on the belt 57. Ring 64 is solid. A brush 65 is mounted so as to bridge the rings 63 and 64 and is rotated from the cylinder 58 or from the motor at such speed as to pass from one segment of the ring 63 to the next segment as each of the figure characters on the belt passes a given point. A detent wheel 66 is also mounted for rotation with the cylinder and is provided with a series of notches 67 adapted to be engaged by a detent 68 operated by a magnet 69.

One end of the winding of the detent magnet 69 is connected by a conductor 70 to the front contact of one of the master relays 55 and thence through the tongue of the master relay to a source of negative potential. The opposite end of the winding of the detent magnet is connected by a conductor 71 to terminal 61 of the driving motor. The terminal 62 of the motor is connected to the contact of a motor control relay 72 and through the tongue thereof to a source of positive potential. The solid commutator ring 64 is also connected to the motor terminal 61.

Each of the ten segments of ring 63 is connected by one of a group of conductors 73 to one contact of the "figure" switches 13 of the receiving selector. The opposite contact of each switch is connected to negative potential. While we have shown only four contacts of the tens values it is understood that the receiving selector may have eight contacts for the fractional values of the quotation, ten for the units, ten for the tens and up to ten contacts for the hundreds. When employing a six unit code however, there are only four combinations available for the hundreds value of the quotation. Each "figure" switch has an auxiliary contact 74 arranged so as to be engaged by the negative contact of each switch when it is closed. The contacts 74 are connected to one end of the winding of the motor control relay 72, the opposite terminal of which is connected to positive battery.

The indicator unit is mounted within a casing, the front wall 75 of which has a window 76 therein located between the idler rollers 59 and 60 and through which a single figure on the belt may be observed.

The operation of the indicator unit is as follows. Assuming figure selecting switch 3 to have been closed and the master relay 55 for selecting this particular indicator to have been operated, a circuit is first completed from the negative source of potential through the auxiliary contact 74 of "figure" selecting switch 3, to the winding of motor control relay 72. This relay then picks up and completes a circuit through the contacts of the master relay 55, winding of the detent magnet 69, winding of the indicator motor and contacts of relay 72 to positive battery. The detent 68 is withdrawn from the detent wheel to permit the cylinder to rotate under the action of the motor so as to drive the belt 57 past the window 76. As the cylinder revolves the brush 65 passes over the commutator contacts until it engages contact 3 of ring 63. At this time a shunt path is provided for the motor through segment 3 of the commutator and the "figure" switch 3 of the receiving selector, thus short circuiting the detent magnet 69 which thereupon releases its detent to again engage the detent wheel and bring the cylinder to rest. The motor circuit remains closed, however, until the figure selecting switch 3 is opened. The motor may drive the cylinder 58 through a slip clutch, not shown.

In Figure 2 we have shown three indicator units for stock "A", corresponding to the tens, units and fractional values of the quotation. If desired a fourth indicator corresponding to the hundreds value of the stock may also be provided. The rings 63 and 64 of the commutator are shown developed. The driving motor is indicated at 77 and the detent magnet at 69. The ten segments of the ring 63 are connected by a group of wires 73 to the ten figure switches, corresponding to the tens value of the quotation at the receiving selector. Likewise the ten segments of the units indicator are connected to the corresponding ten unit switches of the receiving selector and the eight segments of the fractions indicator commutator are connected to the fractions selecting switches. For the remaining stocks "AB" to "BA", we have shown a single indicator unit, it being understood that a full set of indicators are employed in actual practice for each stock. The specific arrangement and connections for the indicator units form no part of the present invention and therefore have not been shown complete. They are fully illustrated in our copending application, Serial No. 422,148, filed January 20, 1930.

The return circuit for the indicators of each stock is completed by a group of conductors 78 to the contacts of the master relays corresponding to each stock.

In order to post a particular quotation on the indicator board a group of selecting signals are transmitted to the receiving selector to lock up one of the master relays through the contacts of the selecting relays. A number of figure signals are then transmitted corresponding to the desired digits of the stock quotation which it is desired to post. If the hundreds, tens, units and fractions values of the quotation are all to be posted, four such figure code combinations are transmitted to close a figure selecting switch corresponding to the hundreds, tens, units and fractional values of the stock and thereby to prepare a circuit through the contact segments of each indicator of the stock selected. The indicators are reset by their operating motor to their new position.

The closing of each of the figure switches of the receiving selector 10 operates the commutator 15 associated therewith to reset the commutator brush 16 upon segment 1. Thus, for instance, assuming signals corresponding to a single letter stock abbreviation to have been transmitted, the brush of the commutator would rest upon segment 2 at the time the first figure code combination was transmitted. The closing of each of the figure switches of the receiving selector, completes a circuit through the winding of the latch magnet 25 and the winding 21 of the commutator operating magnet. Upon operation of these magnets the stop arm 20 is raised and locked in raised position by the latch 23. The commutator shaft 17 is thus permitted to rotate continuously until the brush 16 comes on to segment 1 at which time the release arm 26 engages the latch to trip it and thus restore the stop arm 20 into contact with the stock wheel 18, arresting the motion of the brush upon segment 1. The commutator is thus reset at the end of the transmission of each set of figure signals with the brush on segment 1 in readiness for the letter signals of the following stock selection.

After the operation of the fractions indicators it is necessary to restore the system to normal by releasing the master relay of the stock selected. This may be accomplished by providing each of the fraction switches at the receiving selector with an auxiliary contact disposed so as to be closed upon closing of the main contact. However, if desired, the auxiliary contact may be independent of any of the figure contacts, as indicated at 12, in Figure 1, so as to be operated by a separate code signal.

The auxiliary contact 12 completes a circuit from negative battery through conductor 33 to the lock release relay 34 causing energization thereof and thereby breaking the locking circuit to the selecting relays of the stock selected. The master relay is thus released and interrupts the return circuit from the selecting indicators. When the auxiliary switch is operated with the contacts of the fractions switches, the master relay must be sufficiently slow-to-release, to permit the fractions indicators to be set before the indicator return circuit is interrupted.

Referring now to Figures 5 and 6, a more detailed description will be given of the primary receiving selector. It comprises a series of code disks 80, corresponding in number to the number of units of the code. In the present instance six code disks are shown. Each code disk is mounted upon a cylinder 81, Figure 6, so as to have limited rotation around the same in one direction against the action of a spring 82 which tends to return the disk against a stop number 83. Each of the disks has a number of notches or slots 84 in its periphery. A group of contact control bars 85 are arranged around the periphery of the code disks and are biased towards the disks by springs 86. The contact control bars are pivoted around a pivot ring 87.

The code disks are set up in predetermined combinations by the code signals and in each relative position thereof a single set of notches 84 in each of the disks, come into alignment so as to permit one of the contact control bars to move into such aligned notches. A pair of contacts 11 are located adjacent the end of each of the contact control bars so as to be closed thereby when the bars move into the notches of the disks.

The code character impulses are received over the main line 88 by a polarized relay 89. The tongue of the relay 89 is connected to a grounded source of potential and the marking contact 90 is connected to one end of the winding of a magnet 91, the opposite end of the magnet winding being grounded. Upon the reception of a marking or negative impulse over the main line, the magnet 91 will be energized and upon the reception of a spacing or positive impulse, magnet 91 will release its armature.

The code disks 80 are set up in accordance with the code combination transmitted over the line, by the selecting mechanism associated with a cam sleeve 92, having four cam grooves A, B, C, and D.

Cam groove or track A serves to vibrate a striker bar or reed 93 causing it to strike a selecting pin 94 and force it inward against the tension of a flat spring 95, by which it is carried. Whenever the pin is moved inwardly it strikes one of six vertical selecting fingers 96 and pushes it under one of the extension arms 97 projecting from the code disks 80. The striker bar 93 is oscillated once for each of the six selection impulses, by the arm 98 which carries a roller 99 following in the cam groove or track A.

The selecting pin 94 is moved successively in front of the selecting fingers 96 by the traversing bar 100, which is shifted by a link 101, having a roller 102 following in the cam track B. This track or groove B is so shaped that it will cause the bar 100 to position the pin 94 in front of the first or left hand selection finger at the instant the first selecting impulse is received by the relay 89. The pitch or incline of the groove B is such that the pin 94 will be moved synchronously with the line impulses so that it will be successively opposite the proper finger at the time the corresponding impulse of the code is received. At the end of each code or character selection the bar 100 returns the pin 94 to its extreme left hand position during the interval of the rest and start impulses, so that it will be in a position opposite the first selection finger when the first selecting impulse is received.

As pointed out above, the cam track A causes the striker bar 93 to vibrate once for each of the six selecting impulses but in order that the code character may be set up on the code disks it is necessary that the selection fingers should be moved inwardly only when marking impulses are received while they should remain in non-selected position when spacing impulses are received. This distinction is effected by means of a rocker arm 103 which forms the armature of the magnet 91. The rocker arm is pivoted at 104 and has one end normally held by a spring 105 in the path of a stop pin 106 extending from the cam sleeve 92. The opposite end of the rocker arm is connected by a link 107 to a crank 108 extending under the striker bar 93 and which serves to raise the striker bar above the selecting pin 94 so that it will not engage the same when moved inwardly.

The cam sleeve 92 is connected to a continuously operating driving shaft 109 by a slip clutch 110.

Upon the receipt of a character code combination the first or start impulse is always of the marking variety and the magnet 91 is energized in response thereto, thus attracting the rocker arm 103 and removing the same from the path of the stop pin 106. Thereupon, the cam sleeve starts to rotate and at the same time the crank 108 is lowered from under the striker bar 93 to position the striker bar opposite the selecting pin 94.

If the next impulse, which is the first of the selecting impulses, is a marking impulse, the rocker arm 103 will remain in the same position and hence the striker bar 93 will remain opposite the selecting pin 94. The cam groove B will at this instant have positioned the pin 94 opposite the first selection finger 96 and the first notch in the cam groove A will cause the striker bar to strike the pin 94 and move the selection finger 96 under the projecting end of the first extension arm 97.

If the next selecting impulse is a spacing impulse, i. e., of positive polarity, the magnet 91 will release the rocker arm 103 and the link 107, upon movement to the right, will raise the striker bar 93 above the selecting pin 94. Accordingly when the cam groove A causes the striker bar to again move inwardly at the instant of the second impulse it will not engage the pin 94 and hence the selection finger 96 will remain in a non-selected position. In this manner the six selection fingers will be pushed inward or remain in outward non-selected position in accordance with the marking and spacing impulses of the code character.

Before the six selection fingers were positioned, the roller follower 111, carried by the lever 112, riding in the cam groove C caused the lever to slide the sleeve 113 to the right against the inner ends of the arms 114 of the entire annular set of contact control bars 85, thus rocking all the bars upon the pivot ring 87 and lifting the bar, which had been selected by the preceding code combination, from the slots or notches of the code disks and permitting the disks to be returned by their springs 82 to initial position.

Immediately following the positioning of the selection fingers and while the bars 85 are held away from the disks the follower roller 115 enters the offset in the cam groove D, thereby rocking the triangular lever 116 (Figure 7) on its pivot 117 and thereby lifting the link 118 carrying the rod 119 and the selection fingers 96. The fingers which were selected and pushed inwardly by the pin 94, now lift their associated extension arms 97 and rotate the disks 80 about the stationary supporting drum 81.

At the instant the disks have been shifted in accordance with the new code combination, the follower roller 111 passes an offset in cam groove C, thereby sliding the sleeve 113 to the left and permitting the contact control bars to be brought momentarily against the disks by their retractile springs 86. One bar, representing the character selected by the code combination, enters the aligned row of notches in the disks. The next instant the selection fingers 96 are all returned to their initial position by the return lever 120.

The operation of the return lever 120 is as follows. As the striker pin positioning bar 100 moves to the right across the six selecting fingers, the outer end of this bar moves the pivoted lever 121 about its pivot 122. A yoke shaped member 123 is pivoted to the outer end of the arm 121 and is provided with two arms 124 and 125. The arm 124 normally rests against an abutment 126, the other arm 125 being yieldingly held by a spring 127 against one end of a bell crank lever 128, to the offset end of which, the return bar 120 is pivoted. As the bar 100 approaches the end of its travel the yoke arm 125 slides from the end of the lever 128, thus permitting the spring 127 to swing the yoke on its pivot until the arm 125 engages the right hand side of the bar 128. When the bar 100 moves on its return stroke, towards the left, the yoke arm 125 pushes the lever arm 128, causing the return lever 120 to move forward and pull the selecting fingers 96 back to their initial position. The yoke arm 124 then strikes the abutment 126 and rocks the yoke on its pivot until the end 125 again slips over the top of the lever arm 128.

The construction and operation of the primary receiving selector is more fully described in connection with an automatic printing telegraph system, in a copending application of Dirkes and Wheeler, Serial No. 285,838, filed June 16, 1928 and entitled Telegraph receiving apparatus.

While we have described our selecting system with special reference to alphabetical stock designations, such as are employed in stock transactions, it is to be understood that numerical designations may be used of one, two, three, or more digits, in which case the receiving selector would require but ten selecting contacts. This would release sixteen of the code combinations for other functions, such as operation of the indicators, posting the volume of sales and the like.

It is obvious of course, that numerous changes may be made in the selecting system and apparatus disclosed without departing from the invention and we contemplate all such changes as come within the scope of the appended claims.

What we claim is:

1. In a selecting system a plurality of electrical devices, each having a distinctive designation comprising one or more characters, a selecting relay individual to each electrical device for each character of the distinctive designation thereof, means responsive to character code signals for preparing circuits representative of each code signal, means for completing said circuits in succession through the windings of the selecting relays corresponding to said character code signals, and a circuit for each of said electrical device completed upon operation of each of the selecting relays individual thereto.

2. In a selecting system a plurality of electrical devices each having a distinctive designation comprising one or more characters, a selecting relay individual to each character of the designation of each electrical device, said selecting relays being arranged in groups corresponding to the order of the characters of each designation, means responsive to a group of character code signals for operating the selecting relays corresponding to said character code signals in each group in succession, a circuit for each of said electrical devices completed through the contacts of the selecting relays individual thereto, locking circuits for each of said selecting relays and means for interrupting the locking circuits of the selecting relays corresponding to electrical devices having a predetermined number of designating characters when signals are transmitted corresponding to electrical devices having a greater number of designating characters.

3. In a selecting system a plurality of electrical devices having distinctive designations comprising one or more characters, a selecting relay individual to each character of the designation of each electrical device, said relays being arranged in groups corresponding to the order of the characters of each designation, means responsive to character code signals for preparing circuits corresponding to said character code signals, means for completing said circuits in succession through the windings of the relays of each group, corresponding to said character code signals, a circuit for each of said electrical devices completed through the contacts of the selecting relays individual to each electrical device, a locking circuit for each selecting relay and means for interrupting the locking circuit of the selecting relays of one group corresponding to electrical devices not having a representative relay in a succeeding group, when any relay of said succeeding group is operated.

4. In a selecting system, a plurality of sets of selecting relays, each set comprising a primary relay, a primary and secondary relay, or a primary, secondary and tertiary relays, all of the primary relays being grouped, the secondary relays being grouped, and the tertiary relays being grouped, means for operating predetermined of said primary, secondary and tertiary relays in succession, a locking circuit for each of said relays and means for interrupting the locking circuit of the relay of each set having a primary relay only, upon the operation of a secondary relay, and means for interrupting a locking circuit of the relays of each set having primary and secondary relays only, upon the operation of a tertiary relay.

5. In a selecting and indicating system, a plurality of electrical indicators, selecting mechanism therefor comprising a plurality of selecting devices, means comprising a rotary commutator, for operating said selecting devices in succession in response to selecting code signals, means for rotating said commutator a predetermined distance in response to each of said selecting signals, means responsive to other signals for operating said indicators and means acting upon the receipt of each of said other signals for restoring said commutator to its initial position.

6. A selecting system for a plurality of devices having alphabetical designations, comprising an individual selector element for each letter of the alphabetical designation of each device, a primary selector having a contact for each letter used in said alphabetical designation, means for operating the contacts of said selector in succession in accordance with the letters of the designation of the device to be selected and circuits controlled by said contacts for operating the selector elements corresponding thereto, said selector elements by their combined operation completing a single selecting circuit.

7. In a selecting system, a plurality of electrical devices each having a distinctive designation comprising one or more characters, a selecting element individual to each character of the designation of each electrical device, said selecting elements being arranged in groups corresponding to the order of the characters of each designation, a primary selector having a control member corresponding to each character used in said designations, each of said members being constructed and arranged, when actuated in succession, to operate selecting elements representing corresponding characters, and means for restoring to normal all of said operated selecting elements corresponding to devices having a predetermined number of designating characters when a greater number of operations of said control members occur in succession, and means controlled by the combined operation of said selecting elements for effecting the selection of a predetermined one of said devices.

8. In a selecting system, having a plurality of selectable devices, having distinctive designations comprising one or more characters, in which individual selecting elements are provided for each device corresponding to each character of its distinctive designation, the selecting elements being arranged in groups corresponding to the order of the characters in the designation, the method of making a selection comprising creating a succession of selecting conditions corresponding to the designating characters of a particular device to be selected, operating all of the selecting elements in the first group representing characters corresponding to the first selecting condition and upon occurrence of the second selecting condition restoring to normal the portion of said operated selecting elements of the first group corresponding to devices having a single character designation and operating all of the selecting elements of the second group representing characters corresponding to the second selecting condition, and continuing such operation for each group of selecting conditions until all of the selecting elements for said particular selectable device have been operated.

9. In a selecting system, a plurality of groups of selecting relays, a selector variably operable in accordance with received characters for selectively operating said relays, switching means operable at each actuation of said selector for associating said selector with a succeeding group of said selecting relays, a plurality of groups of electromagnets corresponding respectively to the groups of selecting relays, means for conditioning for operation an electromagnet in the first group in accordance with the selecting relay operated in the first group, and means for conditioning for operation an electromagnet in each succeeding group in accordance with the selecting relay operated in the corresponding group and the selecting relay operated in each group preceding the said corresponding group.

10. In a selecting system, a plurality of master relays, selecting relays individual to said master relays, certain of said master relays being controlled by one selecting relay and others by more than one selecting relay, a cyclic operating receiving selector controlled by received permutation code signals for operating said selecting relays, and switching means for associating said receiving selector for a complete cycle of operation thereof, in turn with each selecting relay of the master relay to be selected.

11. In a selecting system, a plurality of electrical devices, selecting relays individual to said electrical devices, certain of said electrical devices being controlled by one selecting relay and others by more than one selecting relay, a cyclic operating receiving selector controlled by received permutation code signals for operating said selecting relays, and switching means for associating said receiving selector for a complete cycle of operation thereof, in turn with each selecting relay of the electrical device to be selected.

12. A selecting system for a plurality of devices having distinctive character designations comprising selecting relays individual to said devices, certain of said devices being controlled by one selecting relay and others by more than one selecting relay, means responsive to signals of the Baudot code type representative of the character designation of an individual device for operating the relay or relays associated with said device and a circuit associated with said device completed through the contacts of said selecting relays.

13. In a selecting system, means for making selections from a large number of devices each of which has a distinctive designation comprising a non-uniform number of characters, a number of individual selector elements for each device corresponding in number to the number of characters in its distinctive designation, means for transmitting in succession code signals representative of each character of the designation of the device to be selected, and means responsive to said signals to operate the selector elements associated with said device to effect by combined operation the selection thereof.

EVAN R. WHEELER.
EMERSON J. SORTORE.